United States Patent
Bernal et al.

(10) Patent No.: US 8,077,352 B2
(45) Date of Patent: Dec. 13, 2011

(54) GAMUT AIM AND GAMUT MAPPING METHOD FOR SPATIALLY VARYING COLOR LOOKUP TABLES

(75) Inventors: Edgar Bernal, Webster, NY (US); Robert P Loce, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 531 days.

(21) Appl. No.: 12/359,649

(22) Filed: Jan. 26, 2009

(65) Prior Publication Data

US 2010/0188672 A1 Jul. 29, 2010

(51) Int. Cl.
*G06F 15/00* (2006.01)
(52) U.S. Cl. ........ 358/1.9; 358/3.23; 358/518; 358/521; 358/523; 382/167; 345/590; 345/602
(58) Field of Classification Search .................. 358/1.9, 358/3.23, 518, 521, 523; 382/162, 167; 345/590, 345/602
See application file for complete search history.

(56) References Cited

U.S. PATENT DOCUMENTS

| | | | |
|---|---|---|---|
| 6,421,142 B1 * | 7/2002 | Lin et al. ........................ | 358/1.9 |
| 6,560,356 B1 * | 5/2003 | Takahashi et al. ............ | 382/162 |
| 6,760,056 B2 | 7/2004 | Klassen et al. | |
| 7,038,816 B2 | 5/2006 | Klassen et al. | |
| 7,090,324 B2 | 8/2006 | Mizes | |
| 7,095,531 B2 | 8/2006 | Mizes et al. | |
| 7,125,094 B2 | 10/2006 | Mizes | |
| 7,952,757 B2 * | 5/2011 | Kaneko et al. ................ | 358/1.9 |
| 2004/0263879 A1 * | 12/2004 | Ito et al. ........................ | 358/1.9 |
| 2004/0263880 A1 * | 12/2004 | Ito et al. ........................ | 358/1.9 |
| 2004/0263882 A1 * | 12/2004 | Ito et al. ........................ | 358/1.9 |
| 2005/0094169 A1 * | 5/2005 | Berns et al. ................... | 358/1.9 |
| 2006/0077488 A1 | 4/2006 | Zhang et al. | |
| 2006/0268297 A1 * | 11/2006 | Han ................................ | 358/1.9 |
| 2006/0274337 A1 | 12/2006 | Dalal et al. | |
| 2006/0290957 A1 * | 12/2006 | Kim et al. ..................... | 358/1.9 |
| 2007/0035748 A1 | 2/2007 | Zhang et al. | |
| 2007/0035749 A1 | 2/2007 | Zhang et al. | |
| 2007/0041028 A1 * | 2/2007 | Seko .............................. | 358/1.9 |
| 2010/0097657 A1 * | 4/2010 | Kuo et al. ..................... | 358/3.01 |

OTHER PUBLICATIONS

Morovic, Jan, "Digital Color Imaging Handbook", Sharma, Chapter 10, pp. 639-685, 2003.

* cited by examiner

*Primary Examiner* — Kimberly A Williams
(74) *Attorney, Agent, or Firm* — Fay Sharpe LLP (57) ABSTRACT

An image processing apparatus, program product, and method determine an achievable gamut achievable by the imaging engine or engines for all spatial locations of an output image, or all utilized print engines. A reference gamut is calculated which is any gamut containing the achievable gamut. A gamut mapping is used to map gamuts from the mean gamut to the achievable gamut, and a set of transformations is calculated for each of a set of input colors to a set of target colors selected from colors in the achievable gamut. Values for a received digital image are transformed for each image pixel or clusters of pixels based on the calculated set of transformations. Output images are generated based on the transformed values.

21 Claims, 4 Drawing Sheets

GAMUT AIM AND GAMUT MAPPING METHOD FOR SPATIALLY VARYING COLOR LOOKUP TABLES

BACKGROUND

Image non-uniformity has long been a difficult problem for most digital marking processes. Streaks are one-dimensional image defects that generally run parallel to the process direction in a printed image. They are typically caused by the undesirable non-uniform response of some components in a marking engine. Defects in the subsystems of a xerographic printer, an inkjet printer, or similar image forming system may give rise to visible streaks in a printed image. For example, photoreceptor scratches, contamination of the charger wire, non-uniform LED imager and Raster Output Scanner (ROS) spot size variations are examples of subsystem problems giving rise to rendered image streaking in a xerographic marking engine. Bands are also one-dimensional image defects that generally run perpendicular to the process direction in a printed image. They are typically caused by time-varying performance of a marking subsystem such as non-uniform velocity of the photoreceptor drive, out-of-roundness of development rolls, and wobble of the ROS polygon mirror. In a uniform patch of gray, streaks and bands may appear as a variation in the gray level. In general, "gray" refers to the optical density or area coverage value of any single color separation layer, whether the toner is black, cyan, magenta, yellow or some other color.

Figure 1:
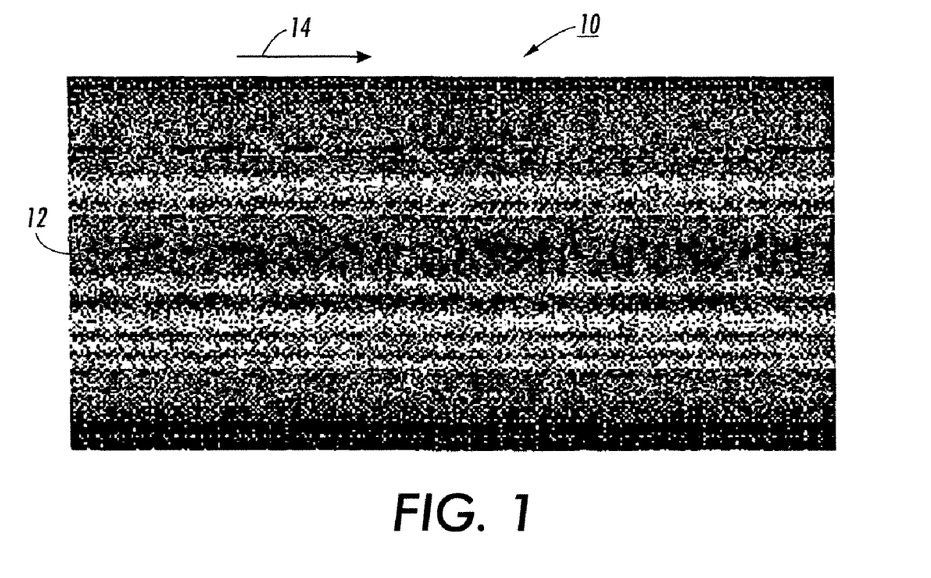
FIG. 1 is an exemplary illustration of streaking as it may appear in a printed document.

With reference to FIG. 1, an exemplary illustration of streaking as it may appear in a printed document is shown. An image patch 10, having a single gray level value, contains a number of exemplary streak defects 12 which run parallel to a process direction 14. Each streak defect in this example extends along a process or slow-scan direction, while the various different streak defects are adjacent to each other along the cross-process or fast-scan direction. The magnitude of the streaking or the difference in toner intensity is thus a function of cross-process position. It is to be appreciated, however, that the defects shown are only exemplary, and embodiments described herein are not limited to defects running parallel to a process direction. In various exemplary embodiments described herein as systems and methods, streaks or improper toner density regions caused by spatial non-uniformity are compensated for prior to actual printing of the document.

Spatial uniformity correction via spatially varying tone reproduction curves (sTRCs) and spatially varying multi-dimensional lookup tables (sDLUTs) has been demonstrated to be effective in compensating for monochromatic and process-color streaks, and in compensating for side-to-side non-uniformity. These methods generally map the set of spatially varying engine response curves across the page to the mean engine response to attain a spatially uniform overall printer response. However, it was found that mean density was not achievable for all positions on the page for densities close to the maximum density ($D_{max}$), and an "Achievable Aim TRC" method was developed to address this problem for monochromatic streaks as described in U.S. Patent Application Document No. 2006/0077488. However, it has been shown that a similar problem exists for process-color streaks and sDLUTs. That is to say, the spatial mean color gamut may be unattainable by some of the local engine responses, thus rendering the compensation ineffective for particular colors on certain portions of the page.

Previous sDLUT implementations for streak compensation map the local engine response to the spatially averaged engine response. This method suffers from a limitation in its ability to compensate for streaks because the color gamut defined by this mean engine response may be unattainable at portions of the page where the local engine response curves have smaller color gamuts. Streak compensation will not be effective for out-of-gamut colors at those regions.

The present application provides a new and improved apparatus and method which overcomes the above-referenced problems and others.

INCORPORATION BY REFERENCE

U.S. Pat. Nos. 6,760,056 and 7,038,816 by Klassen et al. disclose a method for compensating for streaks by introducing a separate tone reproduction curve for each pixel column in the process direction. A compensation pattern is printed and then scanned to first measure the ideal tone reproduction curve and then detect and measure streaks. The tone reproduction curves for the pixel columns associated with the streak are then modified to compensate for the streak.

U.S. Pat. No. 7,095,531 by Mizes et al. discloses a compensation pattern for identifying image defects having a plurality of halftone regions that are lead by, trained by, and separated by rows of fiducial marks.

U.S. Pat. No. 7,125,094 by Mizes discloses a method for compensating for streak defects which includes printing a compensation pattern usable to determine a difference in gray level between an actual gray level value and an intended gray level value at a cross-process-direction image-forming device pixel location in the image, scanning the compensation pattern to generate a set of scanned image data, the scanned image data defining an image value for each of a plurality of cross-process direction scanned image pixel locations, analyzing the scanned image data based on the cross-process direction scanned image pixel locations of the marks of the first and second sets of alignment marks to determine at least one actual gray level value for at least one of the plurality of gray level portions for at least one cross-process-direction image-forming device pixel location, and generating a compensation parameter based on the determined actual gray level value for that analyzed gray level portion and the intended gray level value for that analyzed gray level portion.

U.S. Pat. No. 7,090,324 by Mizes discloses a system for compensating for defects in an image forming system which may give rise to visible streaks, or one-dimensional defects in an image that run parallel to the process direction.

U.S. patent application Ser. No. 10/922,316 by Zhang et al. discloses a method for determining an achievable aim tone reproduction curve for print uniformity which is achievable by all points in a printer.

U.S. patent application Ser. No. 11/143,818 by Dalal et al. discloses a method for identifying spatially dependent colorant interaction effects and isolating them from other aspects of spatially dependent colorant appearance non-uniformities. A decorrelating function compensates for the identified spatially dependent colorant interaction effects.

U.S. patent application Ser. No. 11/199,692 by Zhang et al. discloses a color transformation method which accounts for colorant interactions. A plurality of tone reproduction curves is determined for one or more of the color separations forming a digital image. For a pixel of the digital image having given input values for a first and second color separation, one or more of the tone reproduction curves are selected which bound the fixed input value for the second color separation and a modified input value is determined therefrom.

U.S. patent application Ser. No. 11/200,227 by Zhang et al. discloses a color correction method which includes establishing a tone reproduction curve in the form of a vector. The vector is a function of a plurality of basis vectors. For a pixel of interest in the digital image, a modified input value for a color separation which corresponds to the input value of the given color separation is identified from the vector.

The foregoing references are commonly owned by the assignee of the present application and are incorporated herein by reference in their entirety.

BRIEF DESCRIPTION

A method is provided for spatial uniformity correction in an imaging system. An achievable gamut is calculated, wherein the achievable gamut is a gamut achievable by the imaging system for all spatial locations of an output image, all utilized print engines, or one printer within a cluster of printers. A reference gamut is also calculated, wherein the reference gamut is any gamut containing the reference gamut. A gamut mapping from the reference gamut to the achievable gamut is found, and a set of transformations are calculated for each of a set of input colors to a set of target colors, wherein the set of target colors are selected from colors in the achievable gamut. Values of a received image are transformed for individual image pixels, or clusters of image pixels, based on the determined set of transformations. An output image is generated based on the transformed values.

Also provided is a computer-readable medium storing a program for causing a processor to execute a process for image spatial uniformity correction in an imaging system. The spatial uniformity correction process performs the following operations. An achievable gamut is calculated, wherein the achievable gamut is a gamut achievable by the imaging system for all spatial locations of an output image, all utilized print engines, or one printer within a cluster of printers. A reference gamut is also calculated, wherein the reference gamut is any gamut containing the achievable gamut. A gamut mapping from the reference gamut to the achievable gamut is found, and a set of transformations are calculated for each of a set of input colors to a set of target colors, wherein the set of target colors are selected from colors in the achievable gamut. Values of a received image are transformed for individual image pixels, or clusters of image pixels, based on the determined set of transformations. An output image is generated based on the transformed values.

Further provided is an image processing apparatus which includes one or more imaging engines for generating output images, and a processor for controlling operation of the image processing apparatus. The processor includes an intersection-calculating unit configured to determine an achievable gamut, wherein the achievable gamut is a gamut achievable by the at least one imaging engine for all spatial locations of an output image, all utilized print engines, or one printer within a cluster of printers. A reference engine response- and gamut-determining unit determines a reference gamut which is any gamut containing the achievable gamut. A gamut-mapping unit maps the reference gamut to the achievable gamut, and a transform-determining unit calculates a set of transformations for each of a set of input colors to a set of target colors selected from colors in the achievable gamut. The image processing apparatus transforms values for a received digital image of each image pixel or clusters of pixels to transformed values based on the determined set of transformations. Output images are generated based on the transformed values.

An advantage of the present application is that it utilizes a realizable gamut aim for all positions of a page.

Another advantage of the present application is that it utilizes a realizable gamut aim for all local print engines for systems having more than one print engine.

Yet another advantage of the present application is that the above-described advantages lead to improved precision in color calibration and characterization.

DETAILED DESCRIPTION

Color and monochromatic images are presently reproduced on a variety of imaging media such as, e.g., computer and television displays, print, projection screens, etc. Furthermore, the reproduced images may have been acquired from a variety of sources such as, e.g., digital cameras, conventional photographs, or original artwork in either analog or digital form. To complicate matters, each reproduction device has limitations with respect to the range of colors which it can reproduce, i.e., its color gamut. In other words, the color gamut of a device is the range of colors attainable by that device. Since each device can, and often does, have a different achievable range (gamut) of colors, it is frequently the case that some colors cannot be made to match the original source exactly. As a result of such gamut mismatches, it becomes necessary to assign the original colors to colors that a given output device is capable of reproducing. This process is often referred to as gamut mapping, and refers to a method for assigning colors from the reproduction medium to colors from the original medium.

As used herein, the term image will be understood to mean a two-dimensional visual stimulus. Associated with this is the concept of digital image data, which are two-dimensional arrays of value multiplets containing information about an image. In other words, while an image is something that is by definition visible, digital image data are not.

Also as used herein, the phrase color imaging medium refers to a medium for capturing or displaying color information (e.g., scanners, digital cameras, displays, prints, projections). Thus, color imaging devices are devices that bring about color reproduction media and can either be identical to them (e.g., a display is both a device and a medium) or different from them (e.g., a printer is a device that is used for obtaining a print—the medium).

And finally, a color gamut is the range of a set of colors. Because these can be represented as locations in a three-dimensional color space, a color gamut can be represented as a volume in such a space. Given that a gamut is a volume and that this volume is finite, it also has a surface, and this is referred to as the gamut boundary. Examples of sets of colors whose gamuts are of interest are the colors in an image or the colors that are reproducible within a given medium.

However, the color gamut is spatially dependent for printers with spatial non-uniformity of monochromatic and/or process colors, for which reason there is, instead of a single color gamut, a set of spatially dependent gamuts. For example, intermediate belt transfer (IBT) print engines suffer from side-to-side process-color non-uniformity that is not present in the monochrome separations. From the set of spatially dependent gamuts, one can define several concepts. For example, the union of all spatially dependent gamuts is referred to herein as the maximum gamut; the gamut defined by the colors obtained with the average engine response curve in the monochromatic case, or multi-dimensional set of points in the process-color case, is referred to herein as the mean gamut; and the intersection of all spatially dependent gamuts is referred to herein as the minimum or intersection gamut. Of these types of gamuts, only the minimum gamut is attainable at every position of the page.

Figure 2:
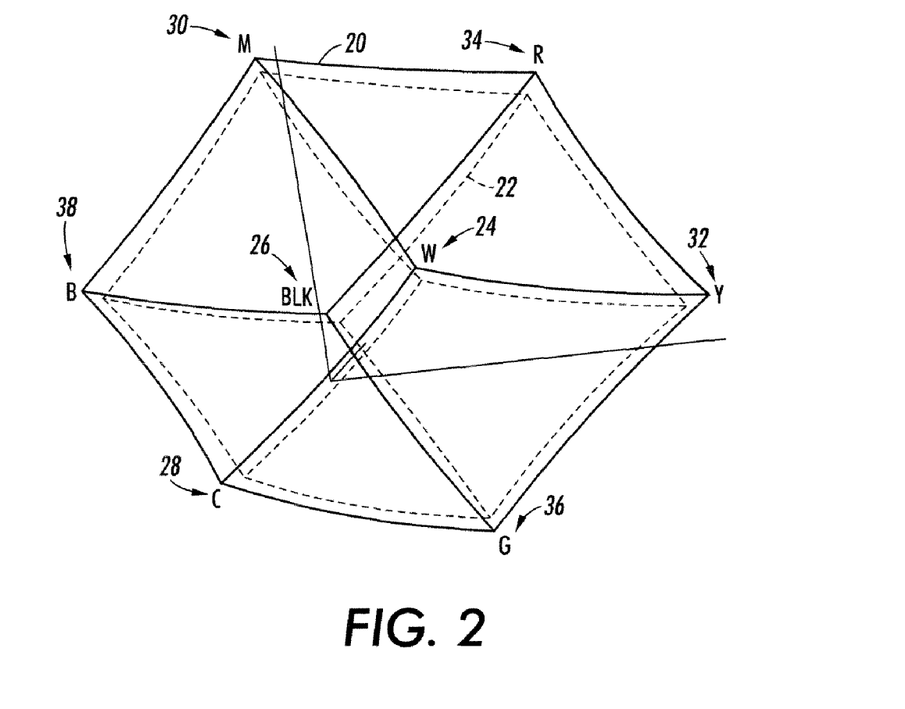
FIG. 2 is an exemplary mean engine response (solid lines) and an exemplary intersection gamut (dashed lines) according to concepts of the present application.

It is desirable for spatial uniformity correction via spatially varying tone reproduction curves (TRCs) and multi-dimensional lookup tables (DLUTs) to map local engine response functions to spatially averaged engine response functions, and to allow other color management operations to vary the average function according to needs other than uniformity such as, e.g., drift, gray balance, user preference, etc. A problem with this approach, however, when applied to DLUTs, is that the gamut defined by average engine response functions may not be attainable at every location of the page. As an example, with reference to FIG. 2, a mean engine response (mean gamut) 20 is shown approximately as a distorted cube (solid lines) having an exemplary volume of 47.4 k $\Delta E^3$. An intersection gamut 22, having an exemplary volume of 40.2 k $\Delta E^3$ (dashed lines) is also shown. The intersection gamut in this example is the intersection of the set of spatially varying gamuts of a color printer operating under conditions known to produce high amplitude streaks. The corners of the distorted cubes correspond to the colors white, black, cyan, magenta, yellow, red, green, and blue 24-38 as shown. It is readily apparent that the mean gamut 20 includes colors not attainable in the intersection gamut 22. The figure therefore illustrates that some intended colors (in the mean gamut) are not attainable at certain portions of the page. In the present application, a commonly achievable gamut and gamut mapping techniques are defined and used to improve the performance of streak and non-uniformity compensation techniques for process colors.

The improvement over prior art sDLUT streak and non-uniformity compensation methods arises from the fact that the present application utilizes a realizable gamut aim and a procedure for simultaneous gamut mapping of multiple printer responses to that aim. Instead of mapping local print engine gamuts to the average print engine gamut, embodiments of the present application map spatially local print engine gamuts to a commonly achievable gamut. The procedure operates by transforming the individual printer responses into a common reference printer response, then gamut mapping from the common response to a commonly achievable gamut. A two-step approach is used because traditional gamut mapping alone does not guarantee spatial uniformity, i.e., it only guarantees color achievability. The common achievable gamut that is employed herein is the intersection of spatial gamuts.

Figure 3:
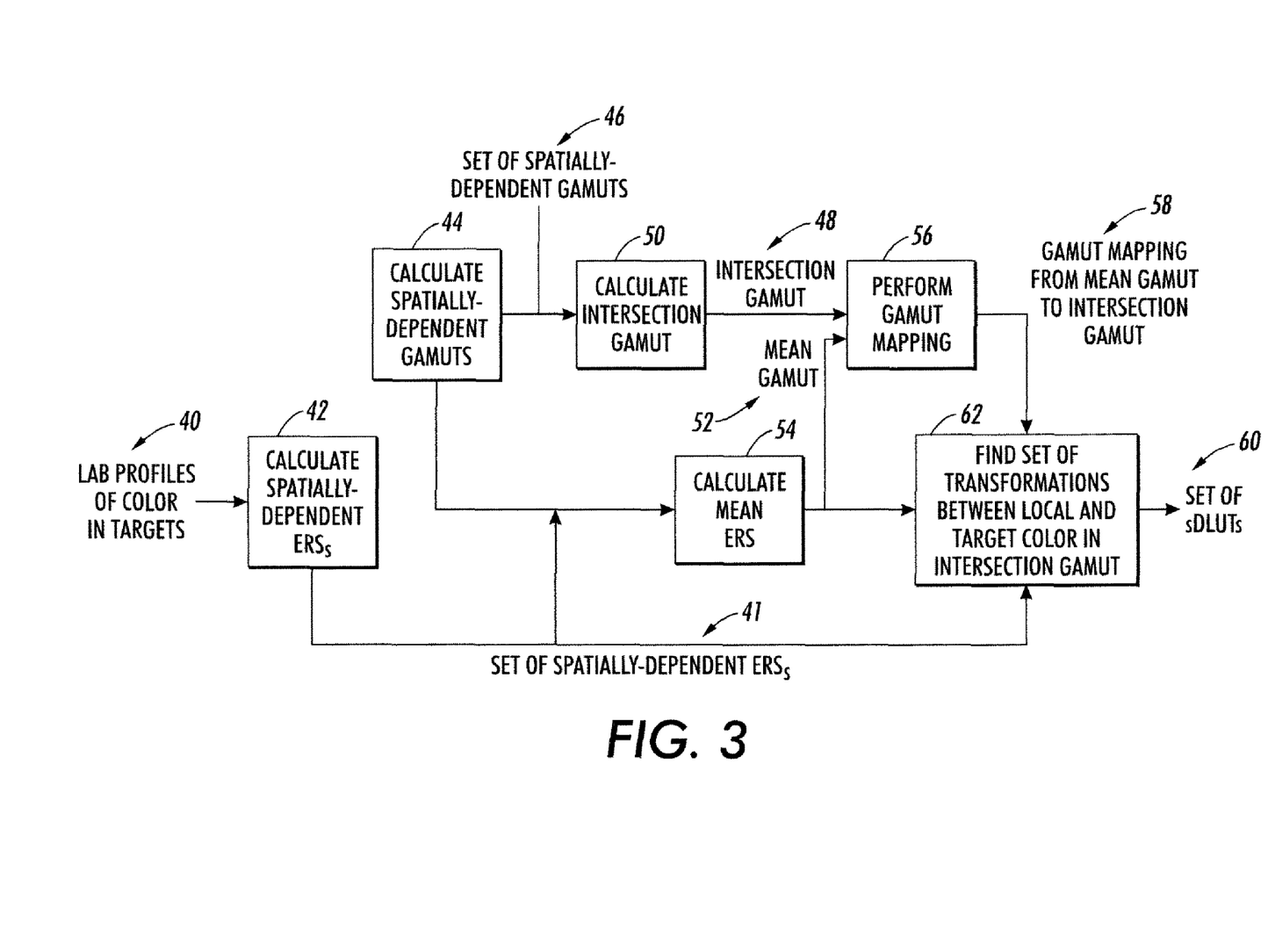
FIG. 3 is a flowchart summarizing steps for spatial uniformity compensation according to concepts of the present application.

With reference now to FIG. 3, a flowchart is provided for summarizing steps of the procedures described herein. Color profiles (e.g. Lab, XYZ, RGB, etc.) of strips from streak compensation calibration targets are used as input 40. For example, suitable strips can occupy the full width of the page and may be 0.5" to 1.5" in length per target color. Spatial color printer models (spatially dependent engine response sets, ERSs (41) are then built in step 42 utilizing the information provided by the color profiles of the strips. In the present context, the color printer models are a mapping from device dependent color space to device-independent color space, and referred to herein as engine response sets (ERSs). The printer engine response sets may be for example ERS: CMY→L*a*b* and K→L*, or CMYK→L*a*b* mappings for each position of the page, i.e., each pixel column or set of pixel columns. More specifically, for example, If x is the spatial index, then $ERS_x$:$(CMYK)_x$→$(Lab)_x$ for each CMYK value for which spatial profiles are available and for x=1, 2, . . . , N, where N is the number of spatial positions being considered. Each spatial location has three sets, e.g., one for L*, one for a*, and one for b*, or the set could be said to be triple valued.

The spatial resolution of the color printer model depends on the application. For example, for narrow streak compensation, there is usually one printer model per pixel column or possibly spanning a few pixel columns (where, e.g., 1 pixel column=1/600 in). For applications such as, e.g., compensation for side-to-side non-uniformity for IBT retransfer, a local printer model (local engine response) could span 300 pixel columns.

Each local color printer model (engine response) has associated with it a color gamut as determined at step 44, where the set of spatially dependent color gamuts associated with the set of spatially dependent engine response sets are computed. From the set of spatially dependent color gamuts 46 determined at step 44, a minimum (intersection) color gamut 48 can be calculated (step 50). This set of spatially dependent color gamuts may, e.g., be a set of Lab values, denoted herein as $\cap_x(Lab)_x$. This color gamut is of particular interest since, in theory, every color within that color gamut can be achieved by the printer, regardless of the position in the page. It is to be appreciated, however, that the present application is not limited to Lab values; other device-independent spaces, including perceptually uniform color spaces such as Luv, or spectral color spaces may be used.

A mean printer model (and its associated mean gamut 52) is computed at step 54 by spatially averaging the Lab values corresponding to the CMY(K) values of the target colors. More specifically, the intermediate, unique reference ERS whose associated color gamut contains the intersection gamut (e.g. the spatially averaged or mean ERS) is computed. Any intermediate engine response known in the art that contains the intersection gamut found in step 44 can be used. However, in the present application, the gamut associated with the mean engine response is used for illustrative purposes. By definition, the intersection color gamut 48 is contained in the color gamut defined by the mean engine response 52. Therefore, a mapping from the mean color gamut 52 to the intersection color gamut 48 can be calculated by using gamut mapping techniques (step 56) as known in the art, e.g., gamut clipping or gamut compression. The gamut mapping maps the color gamut associated with the intermediate reference engine response found in step 54 to the intersection (or minimum) color gamut found in step 50. This defines a mapping denoted as $\overline{Lab} \rightarrow Lab_{target} = \cap_x(Lab)$.

Gamut clipping offers a simple method in that its approach is to modify only those colors in an original image that are outside the reproduction gamut which, in the present application, is the intersection gamut. However, even the simpler gamut clipping approach offers several alternatives such as, e.g., minimum $\Delta E$ gamut clipping (mapping to the color that has the smallest color difference), and hue-preserving minimum $\Delta E$ gamut clipping. Gamut compression algorithms are generally more complex in that they are primarily focused on preserving variations and relationships between nearby colors, and they can potentially affect all of the original colors rather than only the out-of-gamut colors. A simple form of gamut compression known in the art applies a single rule for determining a line along which to map colors, and then compressing along that line. However, other gamut compression techniques are known in the art, including composite gamut mapping algorithms. Further, the present application is not limited to gamut clipping and gamut compression, and any gamut mapping algorithm known in the art may be used in embodiments described herein.

For each target color, the mapping 58 resulting from the composition of the two mappings (the first one mapping to the mean gamut and the second one mapping to the intersection gamut) across the page, yields a uniform color that is attainable at all spatial locations. For non-target colors, interpolation techniques (e.g. tetrahedral or moving-matrix) can be used to infer the appropriate mapping from neighboring target colors.

Finally, from the mean-to-intersection gamut mapping 58, the mean color gamut 52, and the spatially dependent ERSs 41, a set of spatially dependent sDLUTs 60 is determined by finding a set of transformations between local and target color in the intersection gamut (step 62). Since the local printer models span several pixel columns, there are different options to sDLUT applications. The local sDLUT may either be applied to all the pixels within the region it spans, or interpolation between neighboring sDLUTs may be used for pixels in between the central pixels of the regions.

Features of the flowchart provided in FIG. 3 are now described in more detail. Assuming that L*a*b* spatial profiles are available when performing the described steps, the steps are described with reference to CMYK colorants, however, other colorants known in the art may be used. Examples of other colorants commonly used in color printing are light cyan, light magenta, light black (gray), dark yellow, orange, violet, red, green, and blue. While cyan, magenta, yellow and black are considered a conventional colorant set, we may refer to colorant sets with additional colorants as alternative colorant sets. Also, the steps are described for multiple ERSs arising from a set of spatial positions, however, the multiple ERSs may arise instead from sources such as multiple print engines in, e.g., a cluster printing environment, which generally refers to the use of multiple print engines for a given print job and can include specific multiple print engine architectures such as tightly integrated parallel printing and tightly integrated serial printing. Further, the multiple ERSs may arise from a combination of sources such as multiple print engines and spatial positions for one or more of the print engines.

Figure 4:
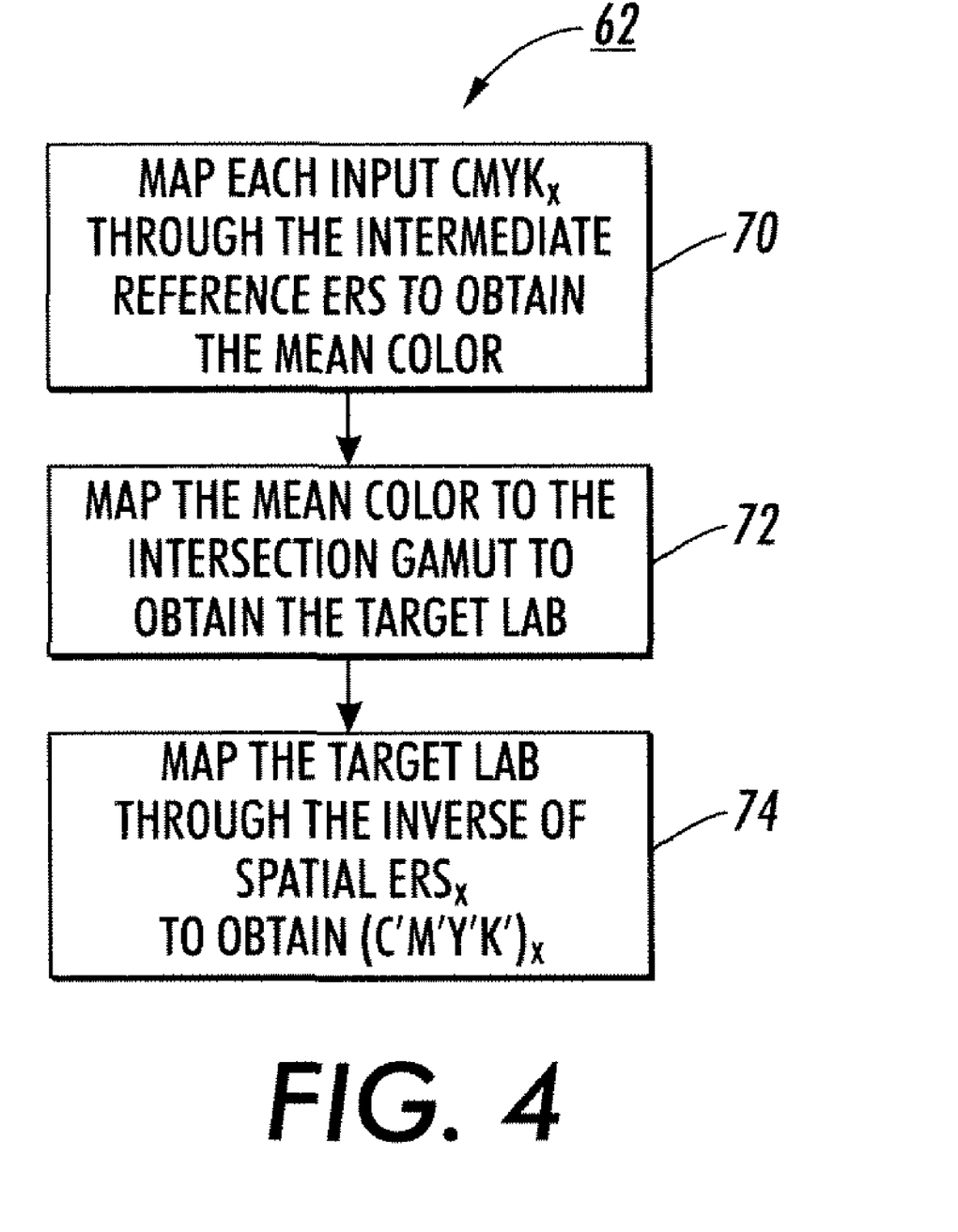
FIG. 4 is a flowchart of a step for finding a set of transformations between the local and target color according to concepts of the present application.

With reference now to FIG. 4, the step 62 for finding the set of transformations between the local and target color (set of sDLUTs) is described in more detail. The final sDLUT is calculated as a composite transformation from $(CMYK)_x \rightarrow (C'Y'M'K')_x$ as follows. First each input $CMYK_x$ is mapped through the intermediate reference ERS (from step 54) to obtain the mean Lab color ($\overline{Lab}$) in step 70. The mean color is then mapped to the intersection gamut (from step 50) to obtain the respective target Lab color ($Lab_{target}$) in step 72 using the mapping calculated in step 56. Finally, $Lab_{target}$ is mapped in step 74 through the inverse of spatial $ERS_x$ to obtain $(C'Y'M'K')_x$. Any inversion technique known in the art, e.g. tetrahedral or distance-weighted regression, can be used. If the spatial $ERS_x$ is an N-to-3 transform, where N>3 (e.g., $CMYK_x$ to $LAB_x$) then the inverse will not be unique. In this case suitable constraints can be applied, e.g., selecting the $(C'Y'M'K')_x$ that is closest to the input $CMYK_x$ in 4-D colorant space.

An image can be compensated for printer non-uniformity by mapping each pixel $CMYK_x$ though the sDLUTs to obtain the (C'Y'M'K'), which is sent to the printer or print engine.

Figure 5:
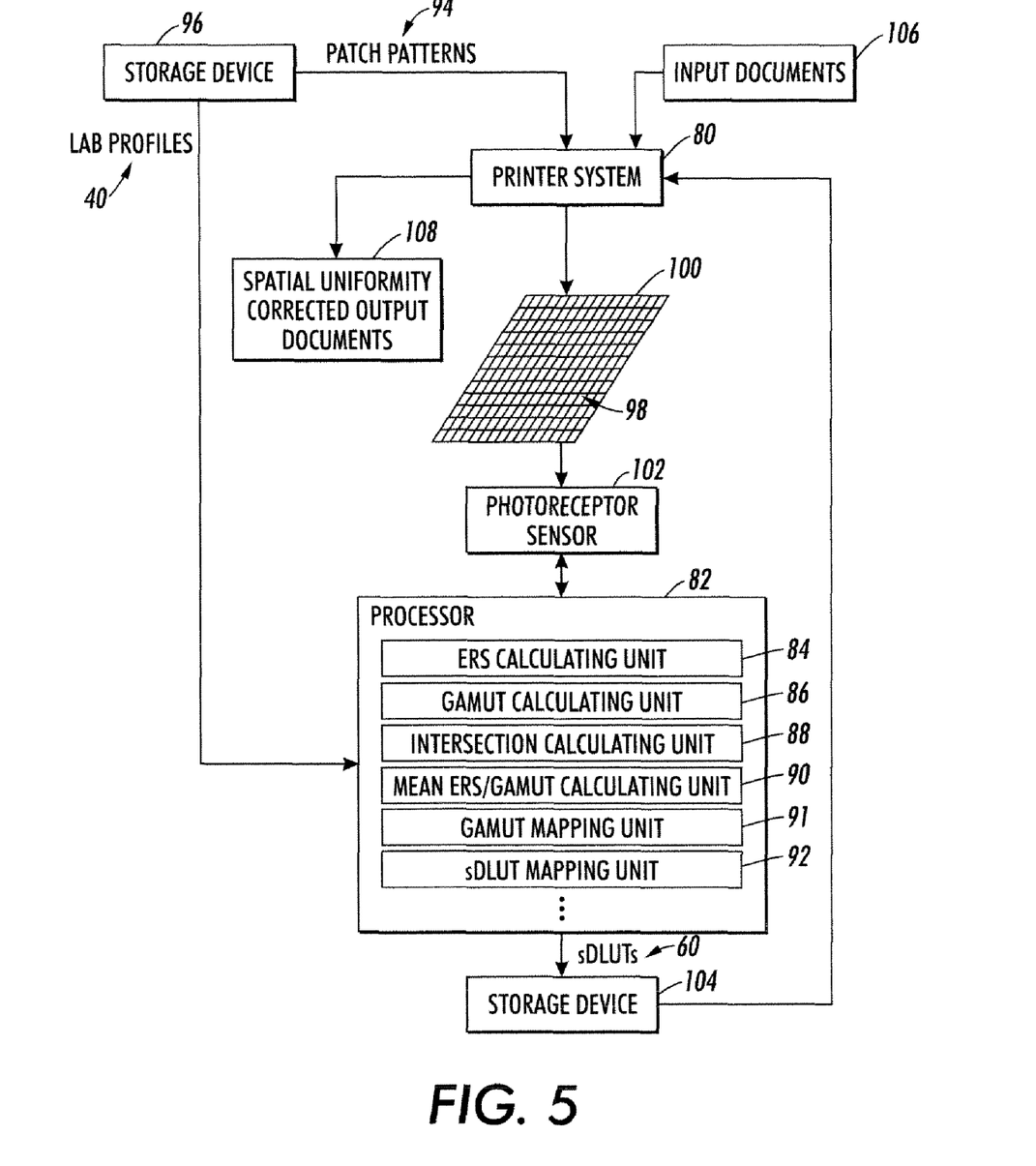
FIG. 5 is a block diagram of an exemplary system incorporating concepts of the present application.

With reference to FIG. 5, and continuing reference to FIG. 3, an exemplary system is shown which incorporates concepts of the present application. A printer system 80 operates under control of a processor 82. It is to be appreciated that, while the processor 82 is shown as a separate device in the drawing, it may be either a separate device or a processing unit housed within the printer system 82. Further, although the printer system 82 is referred to herein as a printer system such as, e.g., a xerographic imaging system, the printer system may also comprise any system utilizing gamut mapping where spatial uniformity correction or correction for multiple print engines is beneficial. The printer system 82 may be any system where multiple spatial responses exist, either in a single imaging device or a cluster of imaging devices. The printer system 82 includes: an ERS-calculating unit 84 for calculating the spatially dependent ERSs as described with reference to step 42; a gamut-calculating unit 86 for calculating spatially dependent gamuts as described with reference to step 44; an intersection-calculating unit 88 for calculating the intersection gamut as described with reference to step 50; a mean ERS/gamut-calculating unit 90 for calculating the mean ERS as described with reference to step 54; a gamut-mapping unit 91 for mapping the mean gamut to the intersection gamut as described with reference to step 56; and an sDLUT-calculating unit 92 for calculating the set of sDLUTs 60 as described with reference to step 62. Further, the processor 82 may contain other processing units as necessary for operation and control of the printer system 80.

For purposes of the present application, the printer system 80, under control of the processor 82, either computes streak compensation targets or retrieves patch patterns 94 from storage device 96 and prints suitable calibration patterns 98 on output media 100. A photoreceptor 102, detects and measures the color value (e.g. Lab, XYZ, RGB, etc.) profiles 40 as input to step 42 as previously described. The processor 82, utilizing the above-described processing units performs the spatial uniformity correction calculations as previously described with reference to FIG. 3 and FIG. 4 and outputs the calculated sDLUTs 60. The sDLUTs 60 are preferably stored on a storage device 104 for use by the printer system 80. It is to be appreciated that the storage device 104 may be the same device as storage device 96, and the storage devices may be part of the printer system 80. Alternately, the calculated sDLUTs 60 can be communicated directly from the processor 82 to the printer system 80.

Consequently, as a result of the above-described processes, the printer system 80 can make use of the sDLUTs 60 when processing documents 106 which are inputted for printing or imaging spatial uniformity corrected output documents or images 108. The printer system 80, as previously described, compensates for printer non-uniformity by sending each image or document pixel, or groups of pixels, to the appropriate sDLUT or sDLUTs (for the cases where spatial interpolation between nodes is needed). The selected sDLUT or sDLUTs are then utilized to determine the color corresponding to the mapped pixel or group of pixels, e.g., CMYK, to be sent to the printer's imaging system, thereby producing the spatial uniformity corrected output documents or images 108. Further, the input documents 106 may be inputted by a user to the printer system 80 by means of a network connection or from a storage device operatively connected to the printer system 80.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. In an imaging system, a method for spatial uniformity correction, the method comprising:
    determining an achievable gamut, wherein the achievable gamut is a gamut achievable by the imaging system for at least one of: all spatial locations of an output image, all print engines of a plurality of print engines, and at least one printer within a cluster of printers;
    determining a mean gamut, wherein the mean gamut is any gamut containing the achievable gamut;
    performing a gamut mapping from the mean gamut to the achievable gamut;
    determining a set of transformations for each of a set of input colors to a set of target colors, the set of target colors selected from colors in the achievable gamut;
    for a received digital image, transforming values of at least one of each received image pixel and clusters of received image pixels to transformed values based on the determined set of transformations; and
    generating an output image based on the transformed values.

2. The method of claim 1, wherein the mean gamut comprises a gamut based on a spatially averaged gamut of the imaging system; and the achievable gamut comprises an intersection gamut.

3. The method of claim 2, the method further comprising:
    determining a plurality of spatially dependent engine response sets, each of the plurality of spatially dependent engine response sets corresponding to a position of the output image, and the spatially dependent engine response sets representing an imaging system model based on a plurality of measured responses to calibration targets;
    determining a mean engine response set based on the plurality of spatially dependent engine response sets, wherein the mean gamut is based on the mean engine response set; and
    determining a plurality of spatially dependent gamuts associated with the plurality of spatially dependent engine response sets, wherein the plurality of spatially dependent gamuts are used for determining the achievable gamut.

4. The method of claim 3, the determining a set of transformations comprising:
    mapping each of a plurality of input colors to its corresponding mean color in the mean engine response set;
    mapping the mean color to a color in the achievable gamut to obtain a mean target color based on the gamut mapping; and
    mapping the mean target color through the inverse of the mean spatial engine response set to determine the colorant combination that produces the mean target color.

5. The method of claim 4, wherein the determining a set of transformations further comprises:
    calculating a set of sDLUTs, wherein the step of transforming values of at least one of each received image pixel and clusters of received image pixels is based on the set of sDLUTs.

6. The method of claim 3, wherein the imaging system is a color printing system utilizing at least one of CMYK color sets, and alternative color sets.

7. The method of claim 3, wherein the engine response sets comprise CMY→L*a*b* and K→L* mappings.

8. The method of claim 3, wherein the engine response sets comprise CMYK→L*a*b* mappings.

9. A non-transitory computer-readable medium storing a program for causing a processor to execute a process for image spatial uniformity correction in an imaging system, the process comprising:
    determining an achievable gamut, wherein the achievable gamut is a gamut achievable by the imaging system for at least one of: all spatial locations of an output image, all print engines of a plurality of print engines, and at least one printer within a cluster of printers;
    determining a mean gamut, wherein the mean gamut is any gamut containing the achievable gamut;
    performing a gamut mapping from the mean gamut to the achievable gamut;
    determining a set of transformations for each of a set of input colors to a set of target colors, the set of target colors selected from colors in the achievable gamut;
    for a received digital image, transforming values of at least one of each received image pixel and clusters of received image pixels to transformed values based on the determined set of transformations; and
    generating an output image based on the transformed values.

10. The computer-readable medium of claim 9, wherein the mean gamut comprises a gamut based on a spatially averaged gamut of the imaging system; and the achievable gamut comprises an intersection gamut, the process further comprising:
    determining a plurality of spatially dependent engine response sets, each of the plurality of spatially dependent engine response sets corresponding to a position of the output image, and the spatially dependent engine response sets representing an imaging system model based on a plurality of measured responses to calibration targets;
    determining a mean engine response set based on the plurality of spatially dependent engine response sets, wherein the mean gamut is based on the mean engine response set; and
    determining a plurality of spatially dependent gamuts associated with the plurality of spatially dependent engine response sets, wherein the plurality of spatially dependent gamuts are used for determining the achievable gamut.

11. The computer-readable medium of claim 10, the determining a set of transformations comprising:
    mapping each of a plurality of input colors to its corresponding mean color in the mean engine response set;
    mapping the mean color to a color in the achievable gamut to obtain a mean target color based on the gamut mapping; and
    mapping the mean target color through the inverse of the mean spatial engine response set to determine the colorant combination that produces the mean target color.

12. The computer-readable medium of claim 11, wherein the determining a set of transformations further comprises:

calculating a set of sDLUTs, wherein the step of transforming values of at least one of each received image pixel and clusters of received image pixels is based on the set of sDLUTs.

13. The computer-readable medium of claim 10, wherein the imaging system is a color printing system utilizing at least one of CMYK color sets, and alternative color sets.

14. The computer-readable medium of claim 10, wherein the engine response sets comprise CMY→L*a*b* and K→L* mappings.

15. The computer-readable medium of claim 10, wherein the engine response sets comprise CMYK→L*a*b* mappings.

16. An image processing apparatus, comprising:
   at least one imaging engine for generating output images; and
   a processor for controlling operation of the image processing apparatus, the processor comprising:
      an intersection-calculating unit configured to determine an achievable gamut, wherein the achievable gamut is a gamut achievable by the at least one imaging engine for at least one of: all spatial locations of an output image, all print engines of a plurality of print engines, and at least one printer within a cluster of printers;
      a mean ERS- and gamut-determining unit configured to determine a mean gamut, wherein the mean gamut is any gamut containing the achievable gamut;
      a gamut-mapping unit configured to perform a gamut mapping from the mean gamut to the achievable gamut; and
      a transform-determining unit configured to determine a set of transformations for each of a set of input colors to a set of target colors, the set of target colors selected from colors in the achievable gamut;
   wherein the image processing apparatus is configured to:
      transform values for a received digital image of at least one of each received image pixel and clusters of received image pixels to transformed values based on the determined set of transformations; and
      generate an output image based on the transformed values.

17. The image processing apparatus of claim 16, wherein the mean gamut comprises a gamut based on a spatially averaged gamut of the at least one imaging engine; and the achievable gamut comprises an intersection gamut, the imaging processing apparatus further comprising:
   an ERS-determining unit configured to determining a plurality of spatially dependent engine response sets, each of the plurality of spatially dependent engine response sets corresponding to a position of the output image, and the spatially dependent engine response sets representing an imaging system model based on a plurality of measured responses to calibration targets, wherein the mean ERS- and gamut-determining unit is configured to determine a mean engine response set based on the plurality of spatially dependent engine response sets, and wherein the mean gamut is based on the mean engine response set; and
   a gamut-determining unit configured to determine a plurality of spatially dependent gamuts associated with the plurality of spatially dependent engine response sets, wherein the plurality of spatially dependent gamuts are used for determining the achievable gamut.

18. The image processing apparatus of claim 17, wherein the transform-determining unit is further configured to:
   map each of a plurality of input colors to its corresponding mean color in the mean engine response set;
   map the mean color to a color in the achievable gamut to obtain a mean target color based on the gamut mapping;
   map the mean target color through the inverse of the mean spatial engine response set to determine the colorant combination that produces the mean target color; and
   calculate a set of sDLUTs, wherein the step of transforming values of at least one of each received image pixel and clusters of received image pixels by the image processing apparatus is based on the set of sDLUTs.

19. The image processing apparatus of claim 17, wherein the image processing apparatus is a color printing system utilizing at least one of CMYK color sets, and alternative color sets.

20. The image processing apparatus of claim 17, wherein the image processing apparatus is a xerographic printing system.

21. The image processing apparatus of claim 17, wherein the engine response sets comprise at least one of:
   CMY→L*a*b* and K→L* mappings; and
   CMYK→L*a*b* mappings.

* * * * *